Patented Mar. 28, 1939

2,151,899

UNITED STATES PATENT OFFICE 2,151,899

PROCESS FOR THE PRODUCTION OF COLORED PICTURE FILMS

Maurice Combes, Paris, France

No Drawing. Application November 26, 1935, Serial No. 51,604. In Germany September 25, 1934

7 Claims. (Cl. 95—2)

My invention relates to color photography, especially to the production of color films, and is an improvement of the known processes in which the picture is taken on two negative films which are then copied on the opposite sides of a positive film the two sides of which latter are then dyed in such manner, that, on projection, a picture in approximately natural colors results. The positive film is first wetted with water in order to facilitate the penetration of the dyes in the emulsion. This may be effected in the known manner by means of inking drums.

According to the invention I dye the one side of the positive film with one or more green and reddish-violet dyestuffs. For this mixture there are used whenever possible green dyestuffs, for example Malachite greens, which are capable of being well mordanted and well fixed, and a reddish-violet dyestuff, for example a triphenyl-methane derivative, which is easy to mordant but less easy to fix. These results can be obtained, for example, by the following composition:

| | Parts |
|---|---|
| Malachite green (oxalate or zinc double chloride of diamido-triphenyl-methane) | 5 |
| Brilliant green (ethyl homologue of Malachite green) | 5 |
| Rhodamine B (basic hydrochloride of tetraethyl-metaamidophenolphthalein) | 2 |

A one-per-cent solution of the dyestuffs is prepared with distilled water, or other solvents such as alcohol or a mixture of alcohol and water, at room temperature and the solution, after filtration, is acidified to a slight extent as with .5 per cent of acetic acid.

For the other side of the positive film there is employed a mixture of dyes which consists at least of a red or reddish-violet dye and a yellow or orange-yellow dye. The two dyes chosen should behave differently as regards fixing on the silver image and as regards the rapidity with which they become mordanted. For example there can be taken a diphenylmethane derivative and a triphenylmethane derivative. An example of a suitable composition for the red side of the positive film is:

| | Parts |
|---|---|
| Rhodamine B (basic hydrochloride of tetraethyl-metaamidophenolphthalein) | 1 |
| Auramine (amino - tetramethyl - diamino-diphenylmethane-chloride) | 1 |

Of the above mentioned dyestuffs, the first is capable of being rapidly mordanted whilst the second is capable of being mordanted only very slowly. These dyes are likewise prepared in a one-per-cent solution. In order to obtain in the image a separation of the red and yellow it is necessary weakly to alkalinize the solution, for instance by addition of ammonia.

The composition of the subsequent mordanting bath should be such that the two sides of the dyed film can be mordanted therein at the same time and that the dyestuffs employed are not dissolved. The following composition, for example, has been found to be suitable:

| | |
|---|---|
| Water grams | 1000 |
| Pure chromic acid do | 3 |
| Potassium ferricyanide do | 5 |
| One per cent sulphuric acid cubic centimeters | 6 |

The presence of sulphuric acid or a similarly acting acid is absolutely necessary since otherwise the mordanting would not take place. The mordanting is completed after about fifteen minutes. The film is then quickly washed and is then treated for about fifteen minutes in a bath of the following composition:

| | |
|---|---|
| Water grams | 1000 |
| Sodium bisulphite cubic centimeters | 20 |

This treatment by which the excesses of the single dyestuffs are removed at different speeds is called "a bleaching".

The film is then washed for fifteen to forty-five minutes and is then dried.

The treatment of the dyed and mordanted positives both with sodium bisulphite and water is very important for the final effect of the colors and has the following signification.

In order to obtain good pictures, it is desirable to be able to graduate differently the intensities of the individual colors during the various treatments. For this reason, the dyes in the example given above have been so chosen that the blue side of the positive is much more rapidly fixed than the red side and is practically insensitive to the last washing, whilst the red side, on the contrary, is very sensitive to the washing. Naturally, the dyes can be chosen so that the converse effects to those just mentioned are obtained, provided that the properties of the dyes used on the blue and red sides of the positive or also the dyes on each side are one with another different as regards the bleaching and the washing.

In the present case of the example above mentioned the film can, for example, be so affected by the washing, that, with a prolonged washing, the red side becomes more and more yellow and the blue side becomes more and more green, because the Rhodamine is very easily washed out. If it is desired to affect only one side of the positive, the latter can be covered or another dye which is less sensitive to washing can be employed.

It may be that with certain combinations of dyes the means described above for graduating differently the intensities of the single colors will not be quite sufficient to obtain the desired result. In this case it may be preferable to apply a subsequent treatment to the dyes on the finished film.

The subsequent treatment may be effected by further treating at least one side of the finished film wtih sodium hyposulphite, hydrochloric acid or ammonia. If only the one side is to be treated the other side is preferably covered by a coating of lacquer.

By treating one side of the positive with a .001 per cent solution of sodium hyposulphite I obtain an attenuation of the colors of this side. Hereby on the yellow-red side the relation of the red to the yellow is not substantially altered.

By treating the yellow and red side with a .5 per cent solution of hydrochloric acid the yellow dyestuffs are attacked so that by a longer treatment the color changes by steps towards the reddish-violet. On the blue side a corresponding change towards the blue-violet will occur since also in this case the Rhodamine is attacked to a much lesser degree than the green dyestuffs.

In order to change the color towards green the blue side may be treated for about 1 to 3½ minutes with a one-per-cent solution of ammonia.

A further advantage of the present process is that the taking of the negatives can be effected without a yellow filter, it being only necessary to obtain a silver image that is sufficiently rich in contrasts. A yellow filter can be interposed between the copying lamp and the film on copying the negatives on to the positive. In this way, it is possible, by regulating the intensity of light, to obtain a good depth effect on each side of the film without affecting the other side.

I wish it to be understood that I do not desire to be limited to the exact details of procedure herein described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. The process of producing colored picture films in which the two sides of a positive are differently dyed which comprises dyeing the one side of the positive with a weakly acidified mixture of at least one green dyestuff of the Malachite green group and at least one reddish-violet dyestuff of the triphenylmethane group and the other side with a weakly alkalinized mixture of at least one yellow dyestuff and one reddish-violet dyestuff, mordanting the two sides of the positive simultaneously in a solution of chromic acid and potassium ferricyanide acidified with sulphuric acid, washing the film, treating it in a bath of sodium bisulphite, washing again and drying.

2. The process of producing colored picture films in which the two sides of a positive are differently dyed which comprises dyeing the one side of the positive with a mixture of Melachite green, Brilliant green and Rhodamine B acidified with a small amount of a weak organic acid, and the other side with a mixture of Rhodamine B and Auramine, alkalinized by addition of ammonia, mordanting the two sides of the positive simultaneously in a solution of chromic acid and potassium ferricyanide acidified with sulphuric acid, washing the film, treating it in a bath of sodium bisulphite, washing again and drying.

3. The process as claimed in claim 1 which comprises submitting that surface of the finished film which is too intensely colored to the controlled action of a solution of $Na_2S_2O_3$.

4. The process as claimed in claim 1 which comprises subjecting at least one side of the finished film to the controlled action of a solution of hydrochloric acid which will dissolve and release the Rhodamine less than the other dyestuffs and change the color by steps towards the violet.

5. The process as claimed in claim 1 which comprises submitting the blue side of the finished film to the controlled action of a solution of ammonia which will change the color towards green.

6. The process as claimed in claim 1 which comprises copying on the negatives to the positive through a yellow filter.

7. The process as claimed in claim 1 in which the acidification is effected with a low concentration of acetic acid, and in which the alkalinization is effected with a low concentration of ammonia.

MAURICE COMBES.